US009160708B2

(12) United States Patent
Merino Vazquez et al.

(10) Patent No.: US 9,160,708 B2
(45) Date of Patent: Oct. 13, 2015

(54) METHODS AND APPARATUSES FOR HANDLING PUBLIC IDENTITIES IN AN INTERNET PROTOCOL MULTIMEDIA SUBSYSTEM NETWORK

(75) Inventors: Emiliano Merino Vazquez, Leganés (ES); Jesus-Angel De-Gregorio-Rodriguez, Boadilla del Monte (ES); Nuria Esteban Vares, Aranjuez (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 134 days.

(21) Appl. No.: 13/024,030

(22) Filed: Feb. 9, 2011

(65) Prior Publication Data

US 2012/0203879 A1   Aug. 9, 2012

Related U.S. Application Data

(63) Continuation of application No. PCT/EP2011/051829, filed on Feb. 8, 2011.

(51) Int. Cl.
*G06F 15/16* (2006.01)
*H04L 29/12* (2006.01)
*H04L 29/06* (2006.01)

(52) U.S. Cl.
CPC .......... *H04L 61/30* (2013.01); *H04L 65/1006* (2013.01); *H04L 65/1016* (2013.01); *H04L 65/1069* (2013.01); *H04L 61/3045* (2013.01); *H04L 61/3095* (2013.01)

(58) Field of Classification Search
CPC . H04L 65/1006; H04L 61/3095; H04L 61/30; H04L 65/1069; H04L 65/1016; H04L 61/3045
USPC ........................................................ 709/223
See application file for complete search history.

(56) References Cited

U.S. PATENT DOCUMENTS

2009/0215453 A1* 8/2009 Blanco Blanco et al. .. 455/435.1
2009/0245240 A1* 10/2009 Mao et al. ...................... 370/352

(Continued)

FOREIGN PATENT DOCUMENTS

EP          2 106 091 A1     9/2009
WO    WO 2008101838 A2 *    8/2008

OTHER PUBLICATIONS

Larsen, K.L.; Castro, G.; Schwefel, H.; di Carlo, V.S., "Corporate Convergence with the 3GPP IP Multimedia Subsystem," Next Generation Mobile Applications, Services and Technologies, 2007. NGMAST '07. The 2007 International Conference on , vol., no., pp. 29,35, Sep. 12-14, 2007, doi: 10.1109/NGMAST.2007.4343397.*

(Continued)

*Primary Examiner* — Saleh Najjar
*Assistant Examiner* — Oleg Korsak
(74) *Attorney, Agent, or Firm* — Patent Portfolio Builders PLLC

(57) ABSTRACT

The present invention concern methods and apparatuses for handling public identities in an Internet Protocol Multimedia Subsystem, IMS, network. According to a method an HSS receives a request message from an S-CSCF. The request message includes a public identity. The HSS sends a response message including the registered wildcarded public identity to the S-CSCF if the request message includes an indication that the public identity is unregistered, the request message does not include a wildcarded public identity indication, and the public identity, included in the request message, matches with a wildcarded public identity, registered in the HSS. The S-CSCF is thus enabled to fetch a user profile using the wildcarded public identity.

5 Claims, 6 Drawing Sheets

(56) References Cited

U.S. PATENT DOCUMENTS

| | | | |
|---|---|---|---|
| 2009/0252157 A1* | 10/2009 | Van Elburg et al. | 370/352 |
| 2010/0299442 A1* | 11/2010 | van Elburg | 709/229 |
| 2010/0332933 A1* | 12/2010 | Kubota | 714/746 |
| 2011/0310888 A1* | 12/2011 | Merino Vazquez et al. | 370/352 |
| 2012/0011273 A1* | 1/2012 | Van Elburg et al. | 709/238 |

OTHER PUBLICATIONS

"Digital cellular telecommunications system (Phase 2+); Universal Mobile Telecommunications System (UMTS); LTE; IP Multimedia (IM) Subsystem Cx and Dx interfaces; Signalling flows and message contents" (3GPP TS 29.228 version 6.16.0 Release 6), European Telecommunications Standards Institute, vol. 3GPP CT 4, No. V6.16.0, Apr. 1, 2010.*

Larsen, K.L.; Castro, G.; Schwefel, H.; di Carlo, V.S., "Corporate Convergence with the 3GPP IP Multimedia Subsystem," Next Generation Mobile Applications, Services and Technologies, 2007. NGMAST '07. The 2007 International Conference on, vol., no., pp. 29,35, Sep. 12-14, 2007, doi: 10.1109/NGMAST.2007.4343397.*

"Digital cellular telecommunications system (Phase 2+); Universal Mobile Telecommunications System (UMTS); LTE; IP Multimedia (IM) Subsystem Cx and Dx Interfaces; Signalling flows and message contents (3GPP TS 29.228 version 9.3.0 Release 9)", vol. 3GPP CT 4, No. V9.3.0, Oct. 1, 2010, XP01461590.*

Camarillo G. Blanco Ericsson G: "The Session Initiation Protocol (SIP) P-Profile-Key Private Header (P-Header); rfc5002.txt", IETF Standard, Internet Engineering Task Force, IETF CH, Aug. 1, 2007, XP015055074, entire document; pp. 1-14.

International Search Report and Written Opinion for PCT/EP2011/051829 mailed Nov. 11, 2011.

"Digital cellular telecommunications system (Phase 2+); Universal Mobile Telecommunications System (UMTS); LTE; IP Multimedia (IM) Subsystem Cx and Dx Interfaces; Signalling flows and message contents (3GPP TS 29.228 version 9.3.0 Release 9)", Technical Specification, European Telecommunications Standards Institute (ETSI), 650, Route Des Lucioles; F-06921 Sophia-Antipolis; France, vol. 3GPP CT 4, No. V9.3.0, Oct. 1, 2010, XP014061590, entire document.

"Digital cellular telecommunications system (Phase 2+); Universal Mobile Telecommunications Systems (UMTS); Numbering, addressing and identification (3GPP TS 23.003 version 9.3.0 Release 9)", Technical Specification, European Telecommunications Standards Institute (ETSI), 650, Route Des Lucioles; F-06921 Sophia-Antipolis; France, vol. 3GPP CT 4, No. V9.3.0, Jun. 1, 2010, XP014047162, entire document.

Digital cellular telecommunications system (Phase 2+); Universal Mobile Telecommunications System (UMTS); LTE; IP Multimedia (IM) Subsystem Cx and Dx Interfaces; Signalling flows and message contents (3GPP TS 29.228 version 6.16.0 Release 6), Technical Specification, European Telecommunications Standards Institute (ETSI), 650, Route Des Lucioles; F-06921 Sophia-Antipolis; France, vol. 3GPP CT 4, No. V6.16.0, Apr. 1, 2010, XP014046677.

* cited by examiner

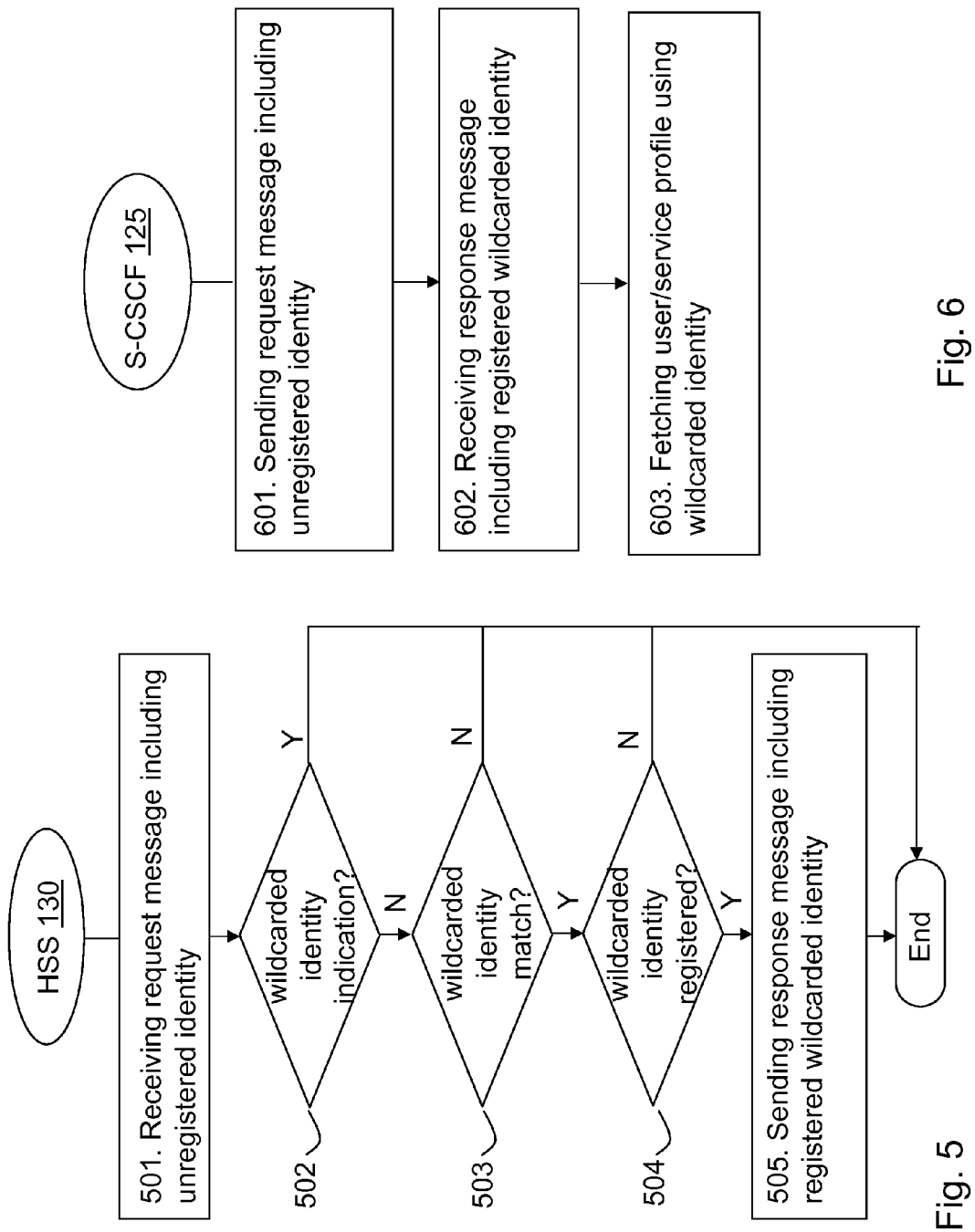

METHODS AND APPARATUSES FOR HANDLING PUBLIC IDENTITIES IN AN INTERNET PROTOCOL MULTIMEDIA SUBSYSTEM NETWORK

TECHNICAL FIELD

The present invention relates to methods and apparatuses for handling public identities in an Internet Protocol Multimedia Subsystem (IMS) network and in particular to methods and apparatuses for handling wildcarded public identities.

BACKGROUND

With the emergence of new technologies for mobile telephony, packet-based communication solutions using Internet Protocol (IP) have been developed to support the usage of multimedia services, while different mobile and fixed user terminals with new functionalities for multimedia communication are emerging on the market. Services are also constantly being developed for terminal users to increase the field of usage and enhance the experience when generally consuming communication services.

An IP Multimedia Subsystem (IMS) network can be used for enabling multimedia services and other communication services by initiating and controlling sessions for user terminals connected to various different access networks. The sessions are handled by specific session control nodes in the IMS network, including those referred to as Call Session Control Function (CSCF) nodes.

A signaling protocol Session Initiation Protocol (SIP) is used for multimedia sessions in IMS networks and other communication services networks.

Various identities may be associated with IMS, such as private user identities, IP Multimedia Private Identity (IMPI) and public user identities, IP Multimedia Public Identity (IMPU). Both IMPI and IMPU are Uniform Resource Identifiers (URIs) that can be digits (a Tel URI, like tel:+1-555-123-4567) or alphanumeric identifiers (a SIP URI, like sip:john.doe@example.com). IMS identities are stored in a subscriber database, hereinafter referred to as a Home Subscriber Server (HSS) together with subscriber service profiles, service triggers and other information.

The IMPI is a unique permanently allocated global identity assigned by the home network operator, and is used, for example, for Registration, Authorization, Administration, and Accounting purposes. Every IMS user shall have one or more IMPI.

The IMPU is used by any user for requesting communications with other users. The IMPU can be published (e.g. in phone books, web pages, business cards). There can be multiple IMPU per IMPI. The IMPU can also be shared between several terminals, so that several terminals can be reached with the same identity (for example, a single phone-number for an entire family).

IMPUs may be stored in the HSS as Wildcarded Public User Identities (wIMPUs). The wIMPU represents a collection of IMPUs that share the same service profile and are included in the same Implicit Registration Set (IRS). An IRS is a group of IMPUs that are registered via a single registration request. When one of the IMPUs within the set is registered, all IMPUs associated with the IRS are registered at the same time. wIMPUs include a regular expression (reg exp) that defines the identities that should be matched and handled as defined for the wIMPU.

A Public Service Identity (PSI) identifies a service, or a specific resource created for a service on an Application Server (AS). The PSI is stored in the HSS either as a distinct PSI or as a wildcarded PSI (wPSI). The distinct PSI contains the PSI that is used in routing, whilst the wPSI represents a collection of PSIs. The format of the wPSI is the same as for the wIMPU.

The handling of wildcarded identities was specified in the Third Generation Project Partnership (3GPP) Release 7 and 8 respectively, see for instance 3GPP Technical Specification (TS) 23.003. wIMPUs have been included in the standards to support Private Branch Exchanges (PBX) where thousands of numbers can be registered from one single identity. Implicit registration is not applicable as downloading thousands of implicit identities registered to the rest of the system is not an option (the message would be too long).

There has therefore been a need for the wIMPU which is associated with a group of IMPUs sharing the same service profile and requiring a single explicit registration to provide services to all the identities behind a PBX. The following conditions are applicable for the wIPMU:

All the identities within the range of a wIMPU will be handled by the same Serving CSCF (S-CSCF) in a situation of routing towards a core network or by the same PBX in a situation of routing between a User Equipment (UE) and the IMS network (Gm interface).

No individual service profile is provisioned anywhere in the network for the specific identities within a wIMPU.

However, an individual service profile may be provisioned for a distinct identity within the range of the wIMPU. A distinct identity is provisioned, i.e. in the HSS, while a specific identity is not provisioned.

The standard document 3GPP TS 29.228 V9.3.0 (September 2010) specifies the interactions between the HSS and the CSCF nodes, referred to as the Cx interface.

Since a distinct public identity falling into the range of a wildcarded public identity can have a different service profile than the wildcarded public identity, 3GPP TS 29.228 has specified a behaviour to ensure application of a correct service profile. The service profile is included in a user profile. The term user profile will hereinafter be used. (The user profile may contain several service profiles.)

Assume that a wIMPU is registered in an S-CSCF so that all terminating calls destined towards any IMPU, within the range of the wIMPU, is routed to the IP address of the PBX. Further assume that a terminating request is received at an Interrogating CSCF (I-CSCF) for an IMPU within the range of the wIMPU. Let us assume that the IMPU is a specific, non-provisioned IMPU. Upon receiving the terminating request, the I-CSCF performs, according to standard procedures, a Cx-Location-Query towards the HSS and receives the S-CSCF name together with an indication that the IMPU matches a wIMPU. Further, the I-CSCF forwards the request to the S-CSCF and also includes the wIMPU. The S-CSCF shall then, according to 3GPP TS 29.228, use the received wIMPU to fetch the user profile. If we instead assume that the IMPU is a distinct, provisioned IMPU, then the I-CSCF will be informed by the HSS that the IMPU is distinct, and will forward the request to the S-CSCF, without including the wIMPU. The S-CSCF shall then, according to 3GPP TS 29.228, use the received distinct identity to fetch the user profile. In this way it is assured that a correct user profile is applied also in the case when a distinct identity, within the range of a wildcarded identity, has a different user profile than the wildcarded identity.

However, the inventors have realised that in a non homogeneous network, when some entities do support optional functionality or protocol enhancements and other entities do not, the above described behaviour may not be followed. The SIP stack in the I-CSCF may not support a P-Profile-Key (PPK) header, which is supposed to carry the wildcarded public identity from the I-CSCF to the S-CSCF. In 3GPP standard documents before Release 10, the PPK header is optional, which implies that the S-CSCF may, incorrectly, not receive the wildcarded identity in situations when the wildcarded identity should have been received. If the S-CSCF does not receive the wildcarded identity in such situations, the HSS may de-register a registered wildcarded public user identity, resulting in terminating calls not being forwarded to the contact address of the wildcarded public user identity. There is therefore a need for solutions that provides for correct handling of wildcarded identities also in non homogeneous networks.

SUMMARY

It is an object of the invention to provide a method and apparatus for handling public identities in an IMS network, which at least partly overcome some of the above mentioned limitations and challenges associated with supporting wildcarded public identities. This object is achieved by means of methods and an apparatuses according to the attached independent claims.

According to different aspects, embodiments of methods and apparatuses are provided for handling public identities in an IMS network.

According to one aspect, a method in a HSS node is provided for handling public identities in an IMS network. The HSS node receives a request message from an S-CSCF node. The request message includes a public identity and an indication that the public identity is unregistered. The HSS node sends a response message to the S-CSCF node if the request message does not include a wildcarded public identity indication, and if the public identity matches with a registered wildcarded public identity. The response message includes the registered wildcarded public identity.

Furthermore, an HSS node is provided for handling public identities in an IMS network. The HSS node comprises a receiver, a transmitter, a memory and processing logic. The processing logic is connected to the receiver, to the transmitter and to the memory. The receiver is configured to receive a request message from an S-CSCF node. The request message includes a public identity and an indication that the public identity is unregistered. The processing logic is configured to initiate the transmitter to send a response message to the S-CSCF node if the request message does not include a wildcarded public identity indication, the public identity matches with a stored wildcarded public identity, and a stored registration state of the wildcarded public identity is registered. The response message includes the registered wildcarded public identity.

According to another aspect, a method in an S-CSCF node is provided for handling public identities in an IMS network. The S-CSCF node sends a request message to an HSS node. The request message includes a public identity and an indication that the public identity is unregistered. The S-CSCF node receives a response message from the HSS node. The response message includes a registered wildcarded public identity. The S-CSCF node fetches a user profile using the wildcarded public identity.

Furthermore, an S-CSCF node is provided for handling public identities in an IMS network. The S-CSCF node comprises a receiver, a transmitter, a memory and processing logic. The processing logic is connected to the receiver, to the transmitter and to the memory. The transmitter is configured to send a request message to an HSS node. The request message includes a public identity and an indication that the public identity is unregistered. The receiver is configured to receive a response message from the HSS node. The response message includes a registered wildcarded public identity. The processing logic is configured to fetch a user profile from the memory using the wildcarded public identity.

Further features and benefits of embodiments of the invention will become apparent from the detailed description below.

BRIEF DESCRIPTION OF THE DRAWINGS

The invention will now be described in more detail by means of exemplary embodiments and with reference to the accompanying drawings, in which:

FIG. 5 is a flow chart schematically illustrating an embodiment of a method in an HSS for handling public identities in an IMS network;

FIG. 6 is a flow chart schematically illustrating an embodiment of a method in an S-CSCF for handling public identities in an IMS network;

DETAILED DESCRIPTION

Figure 1:
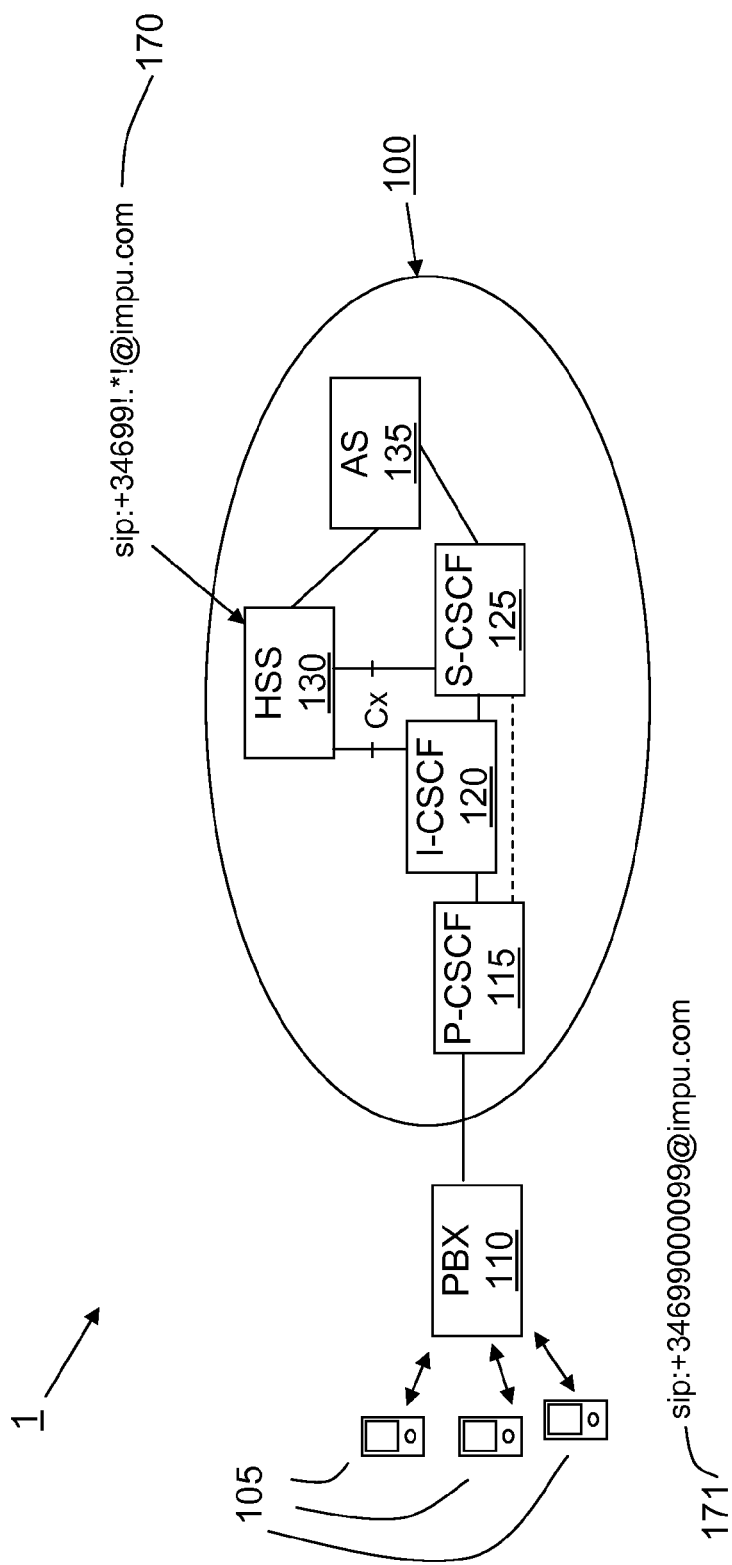
FIG. 1 is a block diagram schematically illustrating a telecommunications system in which embodiments described herein may be implemented.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 illustrates an exemplary telecommunications system 1 in which embodiments of the present invention may be implemented. The telecommunications system 1 includes an IMS network 100 serving a PBX 110. The PBX 110 can, in turn, serve thousands of UEs, illustrated by the UEs 105 in FIG. 1. In this way, thousands of numbers can be registered from a single identity associated with the PBX 110.

The IMS network 100 comprises various CSCF nodes. These CSCF nodes include a Proxy CSCF (P-CSCF) 115 providing a point of contact for users in the IMS network 100, an S-CSCF 125 controlling various sessions for users, and an I-CSCF 120 providing an interface towards other IMS networks and which also queries a subscriber database node, hereinafter referred to as an HSS 130, for user related information during user registration and termination. The interface between the HSS 130 and either the I-CSCF 120 or the S-CSCF 125 is specified in the standards as a Cx interface. Hereinafter only the Cx interface is referred to, but those skilled in the art understands that the description applies in a similar manner to a Dx interface and a Subscription Locator Function (SLF) node, not shown, in situations when there are more than a single HSS 130 in the IMS network 100. The HSS 130 stores subscriber and authentication data which can be retrieved by other nodes for serving and handling different users.

The IMS network 100 also comprises a number of AS nodes configured to provide different communication services when invoked to meet service requests for clients. For the sake of simplicity only one AS 135 is shown in FIG. 1. Each AS 135 may be configured to provide a specific service or a particular set of services. The AS 135 is linked to the session control signaling over an interface to the S-CSCF 125.

Assume that a wIMPU 170, sip:+34699!.*!@impu.com, is stored in the HSS 130. Further assume that the wIMPU 170 is registered in the S-CSCF 125 so that all terminating calls destined towards any IMPU, within the range of the wIMPU 170, is routed to the IP address of the PBX 110. The PBX 110 may e.g. be associated with a company and the wIMPU 170 may be associated with the identities behind the PBX 110, i.e. with extension numbers (e.g. employees) of the company.

Figure 2:
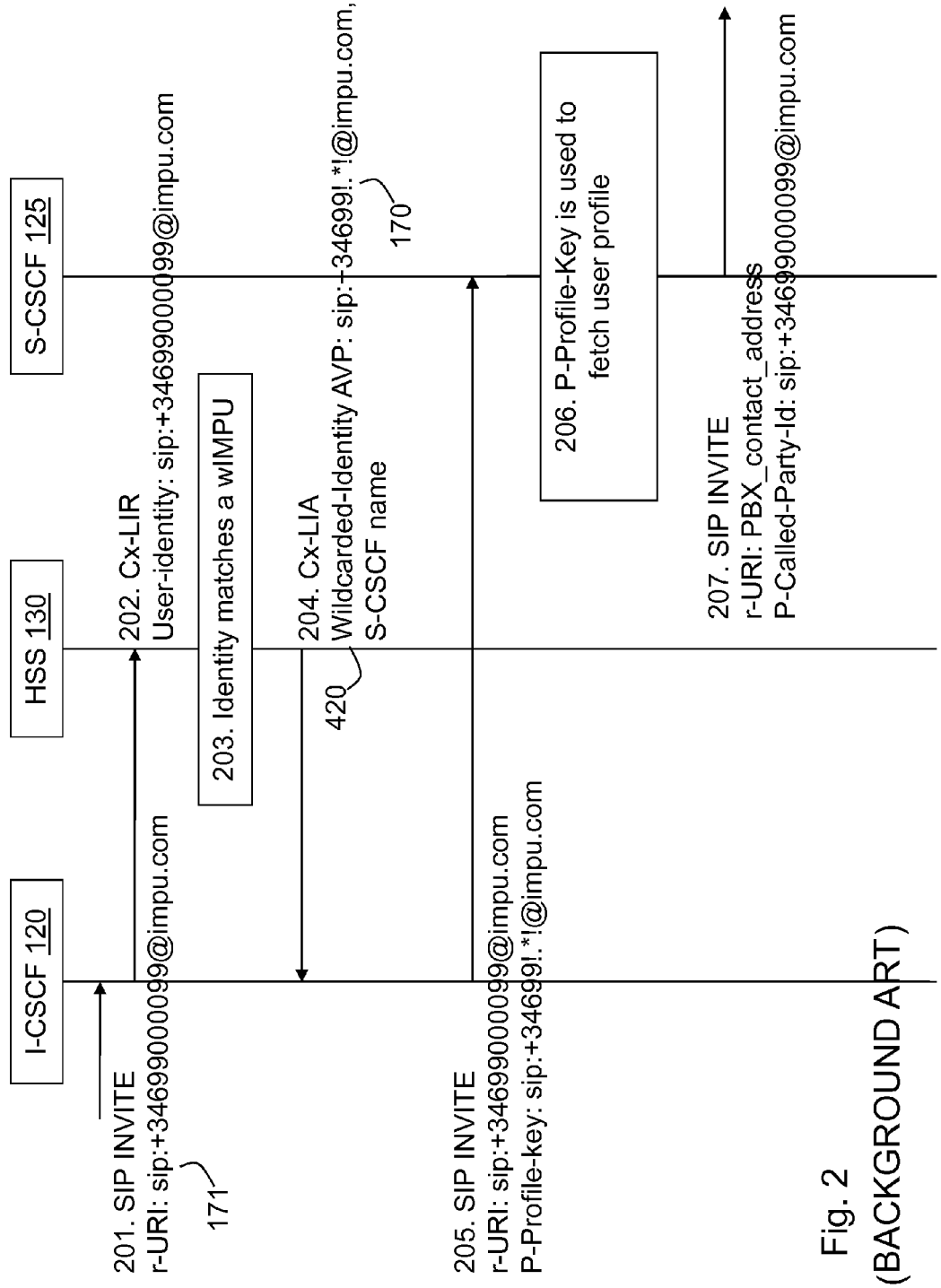
FIG. 2 is a signaling diagram schematically illustrating handling of public identities in an IMS network, when a PPK header is used as a wildcarded identity indication.

FIG. 2 is a signaling diagram schematically illustrating a traffic flow according to 3GPP TS 29.228 for a terminating request related to an IMPU 171, sip:+34699000099@impu.com, within the range of the wIMPU 170. The signaling diagram schematically illustrates a situation when the PPK header is used as a wildcarded identity indication.

Signals and steps indicated by reference numerals 201-207 respectively in FIG. 2 are explained below.

201: A terminating request message (SIP INVITE) is received at the I-CSCF 120. The request includes, in a request-URI (r-URI), the IMPU 171.

202: The I-CSCF 120 performs a Cx-Location-Query towards the HSS 130 to fetch the S-CSCF name for the IMPU 171, i.e. by sending a Location-Info-Request (LIR) including the IMPU 171.

203: The HSS 130 checks if the IMPU 171 exists as such. Since no IMPU is found, the HSS 130 checks if the IMPU 171 falls within the range of a wIMPU. A match is found with the wIMPU 170.

204: The HSS 130 returns a response message, i.e. a Location-Info-Answer (LIA) including the S-CSCF name and an indication that the IMPU 171 matched the wIMPU 170. The indication is that the wIMPU 170 is included in the response message in a Wildcarded Identity Attribute-Value-Pair (AVP) 420.

205: The I-CSCF 120 forwards the request message to the S-CSCF name returned by the HSS 130, i.e. to the S-CSCF 125, and also includes a wildcarded identity indication. The indication is that the wIMPU 170 is included in the request message in the PPK header. Note that the support of the PPK header is optional in the I-CSCF 125.

206: Since a wildcarded identity indication, i.e. the PPK header, including the wIMPU 170, is received, the S-CSCF 125 fetches the user profile and registration information associated with the wIMPU 170. In other words the S-CSCF 125 uses the wIMPU 170 to fetch the user profile, ignoring the IMPU 171 received in the request-URI of the request message, i.e. the identity/extension which is the original destination.

207: The S-CSCF 125 replaces the r-URI by the contact address (e.g. the IP address) of the PBX 110 and forwards the request to the P-CSCF 115 (not shown in FIG. 2), which in turn forwards the request message to the PBX 110. A P-Called-Party-Id is inserted with the content of the r-URI, i.e. the IMPU 171, so that the PBX 110 is able to identify the identity/extension originally called.

As discussed above, in a non homogeneous network, when some entities do support optional functionality or protocol enhancements, and some entities do not, the above described behaviour may not be followed. As indicated in step 205 the SIP stack in the I-CSCF 120 may not support the PPK header. In 3GPP standard documents before Release 10, the PPK header is optional, which implies that the S-CSCF 125 may, incorrectly, not receive the wIMPU 170 in situations when the wIMPU 170 should have been received. As described above such a situation may occur for the specific IMPU 171 within the range of the wIMPU 170. This scenario, when the PPK header is not used as a wildcarded identity indication, is schematically illustrated by the signaling diagram in FIG. 3.

Figure 3:
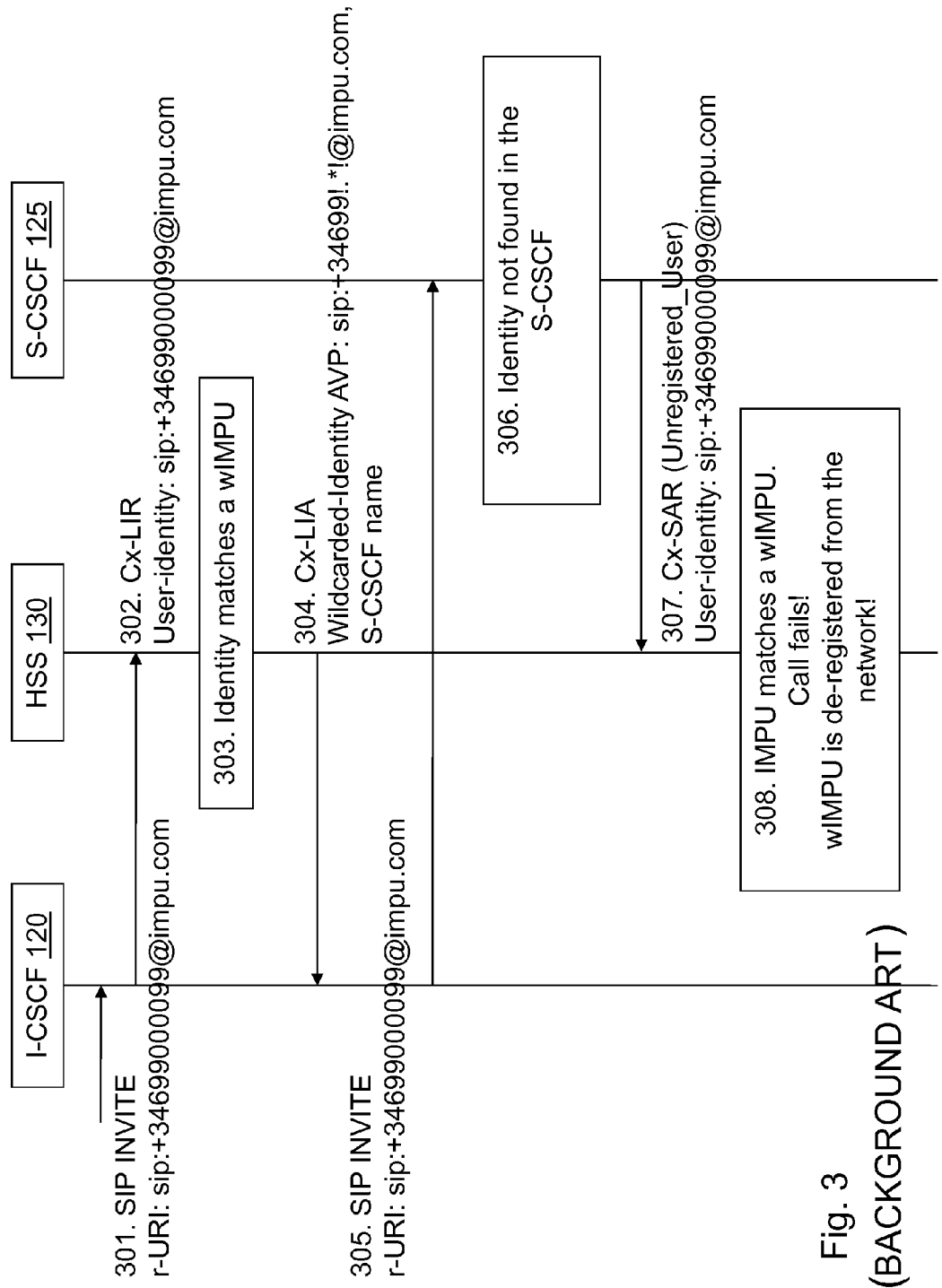
FIG. 3 is a signaling diagram schematically illustrating handling of public identities in an IMS network, when a PPK header is not used as a wildcarded identity indication.

Signals and steps indicated by reference numerals 301-308 respectively in FIG. 3 are explained below.

The steps 301-304 corresponds to the steps 201-204 described in connection with FIG. 2 above. Steps 301-304 will therefore not be explained in further detail.

305: The I-CSCF 120 forwards the request message to the S-CSCF name returned by the HSS 130, i.e. to the S-CSCF 125. Note that since the I-CSCF 120 does not support the PPK header, the wIMPU 170 is not sent to the S-CSCF 125.

306. Since no wildcarded identity indication is received, i.e. the PPK header including a wIMPU, the S-CSCF 125 attempts to fetch the user profile and registration information using the IMPU 171 included in the r-URI. No registration information associated with the IMPU 171 is found, since the IMPU 171 itself is not registered. Note that the S-CSCF 125 does not know that the IMPU 171 is within the range of a wildcarded public identity, since the S-CSCF 125 does not perform wildcarded matching, but relies on the information received from the I-CSCF 120.

307. The S-CSCF 125 sends a Cx-Server-Assignment-Request (SAR) message to the HSS 130 in order to fetch the user profile and includes an indication that the IMPU 171 is unregistered. The indication is Server-Assignment-Type=UNREGISTERED_USER, i.e. registered as a consequence of a request which may trigger unregistered services (e.g. voice mail).

308. Upon receiving the SAR message, the HSS 130 checks if a wildcarded identity indication, i.e. a wIMPU AVP, is received. No wildcarded identity indication is received, so the HSS 130 checks if the IMPU 171 exists as such. Since no IMPU is found, the HSS 130 checks if the IMPU 171 falls within the range of a wildcarded public identity. A match is found with the wIMPU 170. Even though the HSS 130 has the wIMPU 170 stored as registered, the HSS 130 de-registers the wIMPU by changing the status to unregistered and downloads the user profile. According to the present standard the HSS 130 "trusts" the status received from the S-CSCF 125, and accordingly overwrites the status stored in the HSS 130. As a result, the PBX 110 does not receive the incoming call and voice mail is triggered. The fact that the HSS 130 has de-registered 110 but the voice mail instead. Since the PBX 110 cannot be reached by the network for terminating calls, the PBX 110 needs to register again in the IMS network 100, which is done periodically by the PBX 110. However, if an operator would like to speed up the process, the only means would be by manual intervention.

The scenario depicted in FIG. 3 may also occur for an AS calling on behalf of an IMPU within the range of a wIMPU, since the AS may not include a PPK header when sending a request towards the S-CSCF, and accordingly the wIMPU would be de-registered.

Consequently, it is a problem that the PPK header can not be trusted as a wildcarded identity indication in non-homogeneous networks, since some entities in such networks may not support optional functionality. Making the PPK header mandatory does not avoid the problem, since some entities in such networks may still follow older versions of the standard, in which the PPK header is optional. There is thus a need for a solution that ensures correct handling of wildcarded public identities, irrespective of if the PPK header, or any other wildcarded identity indication can be trusted or not.

Briefly described, embodiments of the present invention provide a solution for handling public identities in an IMS network, which in particular increases the reliability of the handling of wildcarded public identities, also in non homogeneous networks.

According to certain embodiments of the invention, procedures in the Cx interface are enhanced/added in order to detect such a scenario in the HSS, when no wildcarded indication is received from the S-CSCF. If such a scenario is detected, the HSS informs the S-CSCF that the IMPU sent in the request matches a wIMPU and therefore associated user profile and registration information for the wIMPU should be used by the S-CSCF. Thus a wrong handling of originating requests can be prevented and the situation described in connection with step 308 in FIG. 3 can be avoided. In other words it can be ensured that the request is correctly forwarded and the correct user profile is used.

Figure 4:
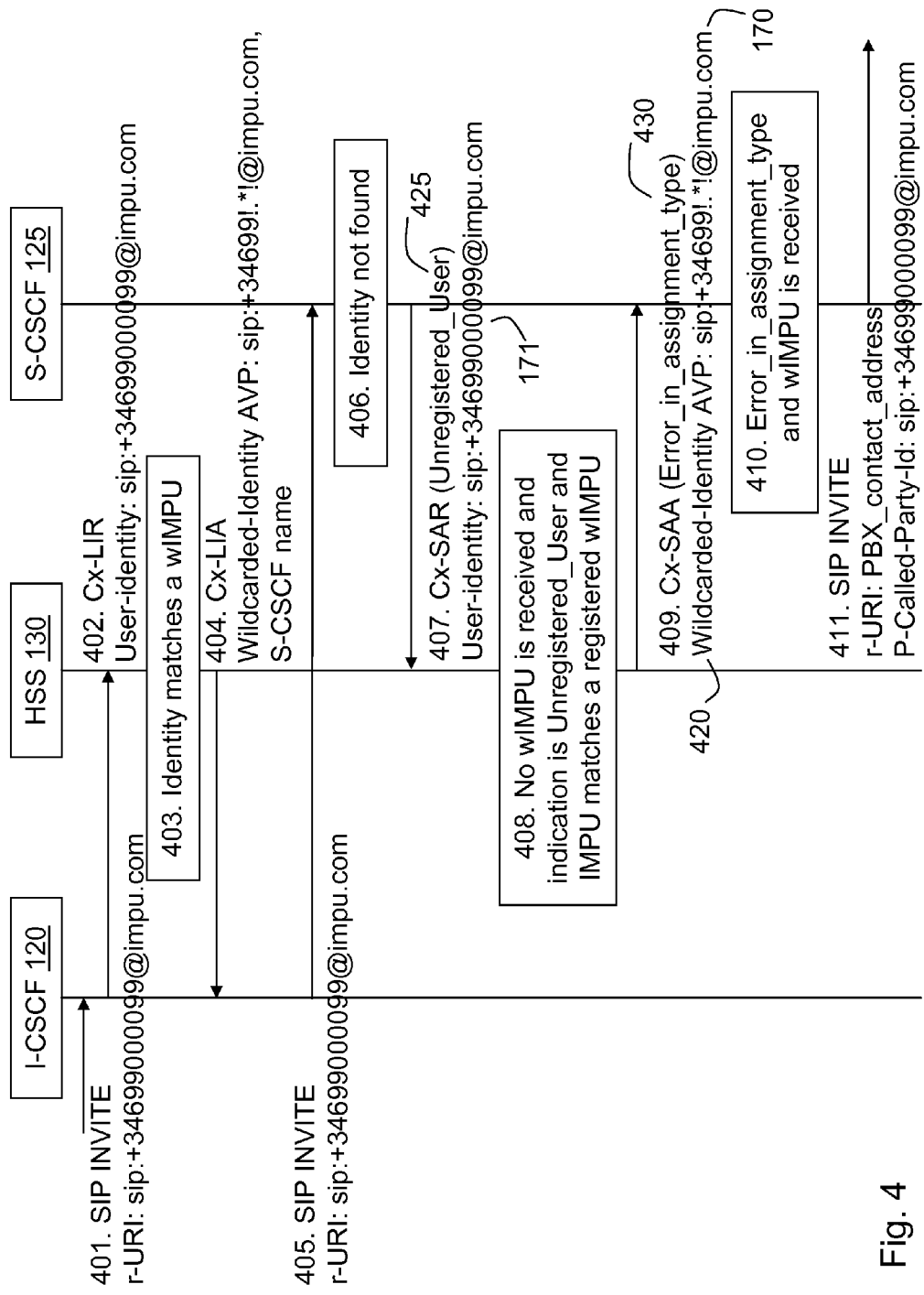
FIG. 4 is a signaling diagram schematically illustrating handling of public identities in an IMS network, in accordance with certain embodiments.

FIG. 4 is a signaling diagram schematically illustrating the traffic flow for a terminating request related to the wildcarded public identity 170, in accordance with an exemplary embodiment of the invention.

Signals and steps indicated by reference numerals 401-411 respectively in FIG. 4 are explained below.

The steps 401-406 corresponds to the steps 301-306 described in connection with FIG. 3 above. Steps 401-406 will therefore not be explained in further detail.

407. As in step 307 of FIG. 3, the S-CSCF 125 sends a request message, in this example a Cx SAR message, to the HSS 130 in order to fetch a user profile and includes an indication 425 that the IMPU 171 is unregistered. In this example the indication 425 is Server-Assignment-Type=UNREGISTERED_USER.

408: The HSS 130 receives the request message, from the S-CSCF 125, including the indication 425 that the IMPU 171 is unregistered. Upon receiving the request message, the HSS 130 checks if a wildcarded identity indication, e.g. a wIMPU AVP, is received. No wildcarded identity indication is received, so the HSS 130 checks if the IMPU 171 exists as such. Since no IMPU is found, the HSS 130 checks if the IMPU 171 falls within the range of a wildcarded public identity. A match is found with the wIMPU 170. The HSS 130 checks a registration state of the wIMPU 170 and finds that the wIMPU 170 is stored in the HSS 130 as registered. In contrast to the behaviour described in step 308 of FIG. 3, if a wildcarded identity indication is not received, and the IMPU 171 matches a wildcarded public identity, and the registration state of this wildcarded public identity is registered, the HSS 130 does not overwrite the registration state. Instead the HSS 130 proceeds to step 409.

409: The HSS 130 sends a response message to the S-CSCF 125 and includes the wIMPU 170 in the response. The response message may include a result code which hereinafter will be referred to as an error code 430. In this example the error code is set to DIAMETER_ERROR_IN_ASSIGNMENTTYPE. The response message may be a DIAMETER SAR message and the wIMPU 170 may be included in a Wildcarded-Identity-AVP 420.

410: The S-CSCF 125 receives the response message including the wIMPU 170. In this example the response message is a DIAMETER SAR message and the wIMPU 170 is included in a Wildcarded-Identity-AVP 420. Now that the S-CSCF 125 has been made aware that the IMPU 171 is associated with the wIMPU 170, the S-CSCF 125 uses the wIMPU 170 to fetch the user profile and registration information locally stored.

411. As in step 207 of FIG. 2, the call may now proceed. The S-CSCF 125 forwards the request to the P-CSCF 115 (not shown in FIG. 4), which in turn forwards the request to the PBX 110.

Consequently, since the HSS 130 includes the wIMPU 170 in the response to the S-CSCF 125, the terminating request can correctly reach the PBX 110. The S-CSCF 125, when receiving the wIMPU 170 from the HSS 130 behaves as if a wildcarded identity indication, e.g. the PPK header, was received in the first place from the I-CSCF 120.

The HSS 130 includes the wIMPU 170 in the response, if:
the request includes an indication that the IMPU 171 is unregistered and
the wIMPU 170 in the request is not present and
the IMPU 171 in the request matches a registered wIMPU in the HSS 130. If the wIMPU 171 is present in the response, it is used by the S-CSCF 125 to identify the identity affected by the request.

A flow chart schematically illustrating an embodiment of a method in the HSS 130, for handling public identities in an IMS network, will now be described with reference to FIG. 5.

Steps indicated by reference numerals 501-505 respectively in FIG. 5 are explained below.

In a step 501, the HSS 130 receives a request message from an S-CSCF. The request message includes a public identity and an indication that the public identity is unregistered. The HSS 130 checks if the request message includes a wildcarded public identity indication in a step 502. If the answer is no, the HSS 130 proceeds to a step 503, otherwise the method ends. In the step 503 the HSS 130 checks if the public identity, included in the request message, matches with a wildcarded public identity. If the answer is yes, the HSS 130 proceeds to a step 504, otherwise the method ends. In the step 504 the HSS 130 checks if the wildcarded public identity is registered in the HSS 130. If the answer is yes, the HSS 130 proceeds to a step 505, otherwise the method ends. The HSS 130 sends a response message including the registered wildcarded public identity to the S-CSCF in the step 505.

The above described steps may be performed in a different order or in a common step. The purpose is to allow the HSS 130 to detect a scenario that indicates that the S-SCSF 125 may not be aware that the public identity falls within the range of a wildcarded public identity. If such a scenario is detected, the HSS 130 informs the S-CSCF 125 accordingly.

A flow chart schematically illustrating a method in the S-CSCF 125, for handling public identities in an IMS network, in accordance with embodiments of the invention, will now be described with reference to FIG. 6.

Steps indicated by reference numerals 601-603 respectively in FIG. 6 are explained below.

In a step 601, the S-CSCF 125 sends a request message to an HSS. The request message includes a public identity and an indication that the public identity is unregistered. The S-CSCF 125 receives a response message from the HSS in a step 602. The response message includes a registered wildcarded public identity. Accordingly the S-CSCF 125 is made aware that the public identity is associated with the registered wildcarded public identity. The S-CSCF 125 fetches a user profile using the wildcarded public identity in a step 603.

Figure 7:
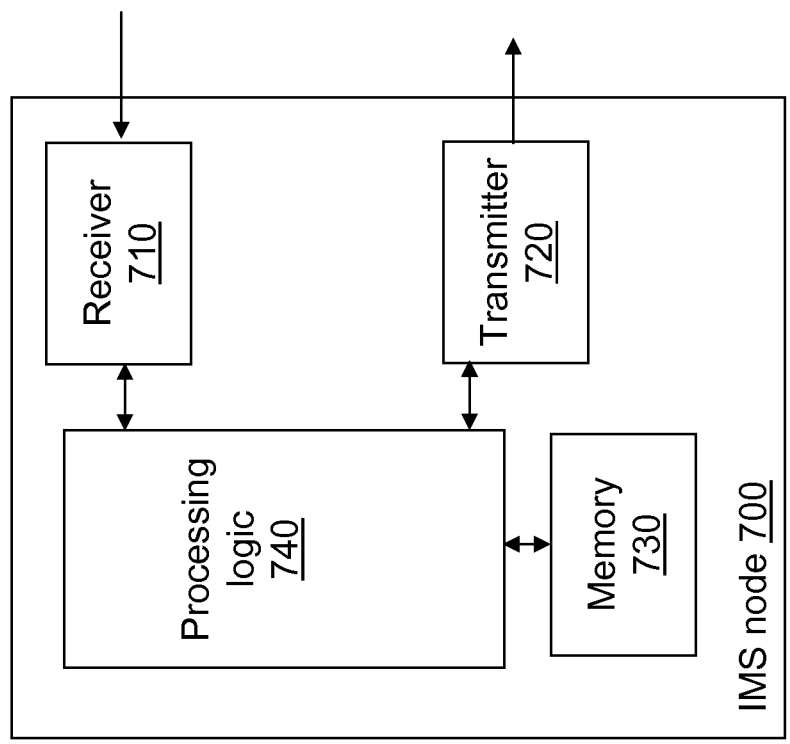
FIG. 7 is a block diagram schematically illustrating an IMS node, which may be an HSS or an S-CSCF node, in accordance with certain embodiments.

FIG. 7 is a schematic block diagram of an IMS node 700 which may be an exemplary embodiment of the HSS 130 or the S-CSCF 125 adapted to execute the methods described in connection with FIG. 5 and FIG. 6 respectively. As illustrated, the IMS node 700 comprises a receiver 710, a transmitter 720, processing logic 740, and a memory unit 730.

The receiver 710 and the transmitter 720 may comprise circuitry that allows the IMS node 700 to communicate with other nodes. The processing logic 740 may control the operation of the IMS node 700.

In particular in a case where the IMS node 700 is an embodiment of the HSS 130, the receiver 710 is configured to receive the request message, according to the step 501, discussed above. Further, in the case where the IMS node 700 is an embodiment of the HSS 130, the processing logic 740 is configured to initiate the transmitter to send the response message, according to the step 505, discussed above, if the request message does not include a wildcarded public identity indication, the public identity matches with a wildcarded public identity stored in the memory 730, and a registration state of the wildcarded public identity, stored in the memory 730, is registered, according to the steps 502-504 discussed above.

In a case where the IMS node 700 is an embodiment of the S-CSCF 125, the transmitter 720 is configured to send the request message, according to the step 601, and the receiver 710 is configured to receive the response message, according to the step 602, discussed above. Further, in the case where the IMS node 700 is an embodiment of the S-CSCF 125, the processing logic 740 is configured to fetch the user profile from the memory, according to the step 603, discussed above.

The processing logic 740 can be a single unit or a plurality of units configured to perform different steps of procedures described herein. The receiver 710 and the transmitter 720 may be arranged as one in a combined transceiver in the hardware of the IMS node 700.

Furthermore the IMS node 700 may comprise at least one, not shown, computer program product in the form of a volatile or non-volatile memory, e.g. an EEPROM, a flash memory and a disk drive. The computer program product may comprise a computer program, which comprises code means which when run on the IMS node 700 causes the IMS node 700 to perform the steps of the procedures described earlier in conjunction with FIG. 5 and FIG. 6. In alternative embodiments, at least one of the code means may be implemented at least partly as hardware circuits.

As described above, embodiments of the invention ensures reliable handling of public identities falling within the range of a wildcarded public identity, also in non homogeneous networks. Serious operational fault in networks where not all the nodes have the same support for optional SIP headers is thus avoided.

An advantage with embodiments described above is that they avoid that a wildcarded public identity is de-registered in the HSS in a situation when a wildcarded public identity is not received at an S-CSCF due to a previous node not supporting optional functionality. Since the HSS, upon reception of a request from the S-CSCF detects that the public identity included in the request falls within the range of a registered wildcarded public identity, and subsequently sends the wildcarded public identity to the S-CSCF, the S-CSCF is able to act as if it would had received the wildcarded public identity from the previous node in the first place.

An advantage with certain embodiments described above is that it can be ensured that a terminating request for a specific public identity within the range of a wildcarded public identity is correctly forwarded to the contact address of the wildcarded public identity and the correct user profile is used.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a Home Subscriber Server, HSS, node, for handling public identities in an Internet Protocol Multimedia Subsystem, IMS, network, the method comprising:
    receiving, from a Serving Call Session Control Function, S-CSCF, node, a request message including a public identity and an indication that the public identity is unregistered; and
    if the request message does not include a wildcarded public identity indication, and if the public identity, included in the request message, matches with a wildcarded public identity, and if the wildcarded public identity is registered in the HSS node, sending, to the S-CSCF node, a response message including the registered wildcarded public identity instead of overwriting a registration state of the wildcarded public identity.

2. A Home Subscriber Server, HSS, node, for handling public identities in an Internet Protocol Multimedia Subsystem, IMS, network,
    the HSS node comprising:
    a receiver, a transmitter, a memory and processing logic, the processing logic being connected to the receiver, to the transmitter and to the memory, wherein
    the receiver is configured to receive, from a Serving Call Session Control Function, S-CSCF node, a request message including a public identity and an indication that the public identity is unregistered,
    the processing logic is configured to initiate the transmitter to send, to the S-CSCF node, a response message including a wildcarded public identity, instead of overwriting a registration state of the wildcarded public identity in the HSS, if the request message does not include a wildcarded public identity indication, the public identity, included in the request message, matches with the wildcarded public identity which is stored in the memory, and a registration state of the wildcarded public identity, stored in the memory, is registered.

3. The HSS node according to claim 2, wherein the processing logic is further configured to include an error code in the response message.

4. The HSS node according to claim 3, wherein the processing logic is further configured to set the error code to ERROR_IN_ASSIGNMENT_TYPE.

5. The HSS node according to claim 2, wherein the processing logic is further configured to initiate the transmitter to send the response message as a Server Assignment Answer, SAA, and to include the wildcarded public identity in a Wildcarded-Identity Attribute Value Pair, AVP.

* * * * *

UNITED STATES PATENT AND TRADEMARK OFFICE
CERTIFICATE OF CORRECTION

PATENT NO. : 9,160,708 B2  
APPLICATION NO. : 13/024030  
DATED : October 13, 2015  
INVENTOR(S) : Merino Vazquez et al.

Page 1 of 1

It is certified that error appears in the above-identified patent and that said Letters Patent is hereby corrected as shown below:

In the specification,

In Column 5, Line 54, delete "I-CSCF 125." and insert -- I-CSCF 120. --, therefor.

In Column 6, Line 61, delete "de-registered 110" and insert -- de-registered the wIMPU 170 implies that all terminating requests will not reach the PBX 110 --, therefor.

In Column 8, Line 31, delete "wIMPU 171" and insert -- wIMPU 170 --, therefor.

Signed and Sealed this  
Tenth Day of May, 2016

Michelle K. Lee  
*Director of the United States Patent and Trademark Office*